US010938329B2

(12) United States Patent
Luo et al.

(10) Patent No.: US 10,938,329 B2
(45) Date of Patent: Mar. 2, 2021

(54) ELECTRICITY GENERATION FROM LOW GRADE WASTE HEAT

(71) Applicant: The University of Notre Dame du Lac, South Bend, IN (US)

(72) Inventors: Tengfei Luo, Granger, IN (US); Shirui Luo, Notre Dame, IN (US)

(73) Assignee: University of Notre Dame Du Lac, South Bend, IN (US)

( * ) Notice: Subject to any disclaimer, the term of this patent is extended or adjusted under 35 U.S.C. 154(b) by 73 days.

(21) Appl. No.: 16/362,353

(22) Filed: Mar. 22, 2019

(65) Prior Publication Data
US 2019/0296661 A1    Sep. 26, 2019

Related U.S. Application Data

(60) Provisional application No. 62/646,612, filed on Mar. 22, 2018.

(51) Int. Cl.
*H02N 3/00* (2006.01)
*C02F 103/08* (2006.01)
(52) U.S. Cl.
CPC ........... *H02N 3/00* (2013.01); *C02F 2103/08* (2013.01)
(58) Field of Classification Search
CPC ....... H02N 3/00; C02F 2103/08; Y02E 10/30; F03G 7/005
USPC .................................................. 310/300, 308
See application file for complete search history.

(56) References Cited

U.S. PATENT DOCUMENTS

| 5,620,595 A | 4/1997 | Austin et al. |
| 8,323,491 B2 | 12/2012 | Brauns |
| 8,501,007 B2 | 8/2013 | Bajpayee et al. |
| 8,568,588 B2 | 10/2013 | Kim et al. |

(Continued)

FOREIGN PATENT DOCUMENTS

| CN | 102001758 | 4/2011 |
| CN | 105048870 A | 11/2015 |

(Continued)

OTHER PUBLICATIONS

"Energy from Water" https://web.archive.org/web/20170202195525/http://sites.psu.edu/energyfromwater/ (Feb. 2, 2017).

(Continued)

*Primary Examiner* — Thomas Truong
(74) *Attorney, Agent, or Firm* — Workman Nydegger

(57) ABSTRACT

Systems and methods for generating electricity from low grade heat. The system and method may be a closed loop. When a liquid mixture of salt, water, and an ion-stripping liquid is heated using the low grade heat, water dissolves more readily into the ISL, due to the increased solubility of the water in the ISL, at the increased temperature. The salt remains in a high-salinity aqueous phase that separates from the ISL phase. Upon cooling of the ISL phase, a nearly pure water phase can be separated therefrom. This low salinity water phase and the high salinity water phase can be fed to any of various processes for generating electricity from a salinity gradient, such as pressure retarded osmosis or reverse electro-dialysis. Low and high salinity water exiting the power generating portion of the process can be recycled, to reform the original liquid stream, upon recombination with the ISL.

20 Claims, 7 Drawing Sheets

(56) References Cited

U.S. PATENT DOCUMENTS

| | | |
|---|---|---|
| 9,260,397 B2 | 2/2016 | Strassner et al. |
| 9,428,404 B2 | 8/2016 | Bajpayee et al. |
| 9,573,078 B2 | 2/2017 | Hembre et al. |
| 9,957,180 B2 | 5/2018 | Govindan et al. |
| 10,183,873 B2 | 1/2019 | De Souza |
| 10,710,905 B2 | 7/2020 | Brehant et al. |
| 2012/0267307 A1* | 10/2012 | McGinnis ............... C02F 1/441 210/638 |
| 2014/0246370 A1 | 9/2014 | Strassner et al. |
| 2016/0133981 A1 | 5/2016 | Hestekin et al. |
| 2017/0259210 A1 | 9/2017 | Kanemaru et al. |
| 2020/0010348 A1 | 1/2020 | Bryant et al. |
| 2020/0030716 A1 | 1/2020 | Hatton et al. |
| 2020/0080169 A1 | 3/2020 | Nockemann et al. |

FOREIGN PATENT DOCUMENTS

| | | |
|---|---|---|
| CN | 106992716 A | 7/2017 |
| CN | 206878725 U | 1/2018 |
| CN | 111186950 | 5/2020 |
| EP | 2903710 | 5/2007 |
| KR | 10-0924702 | 11/2009 |
| TW | 202000930 | 1/2020 |
| WO | 2013121218 | 8/2013 |
| WO | 2017/149101 A1 | 9/2017 |

OTHER PUBLICATIONS

"Salinity gradient solar pond technology applied to potash solution mining," Martell et al. https://www.osti.gov/biblio/756432 (Accessed Mar. 9, 2017).

1-Ethyl-3-methylimidazolium bis(trifluoromethanesulfonyl)imide 99.9%. https://en.solvionic.com/products/1-ethyl-3-methylimidazolium-bistrifluoromethanesulfonylimide-99.9 (accessed Nov. 11, 2020).

1-Ethyl-3-methylimidazolium bis(trifluoromethylsulfonyl)imide 25 g. https://store.p212121.com/1-ethyl-3-methylimidazolium-bis-trifluoromethylsulfonyl-imide/ (accessed.

"Implications for Heavy Metal Extractions from Hyper Saline Brines with [NTf2]- Ionic Liquids: Performance, Solubility, and Cost" (Accessed Oct. 11, 2020).

"Molecular design targets and optimization of low-temperature thermal desalination systems" (Accessed Oct. 11, 2020)/.

"Supported ionic liquid water sorbent for high throughput desalination and drying" (Accessed Oct. 11, 2020).

"Surface loaded 1-methyl-3-ethylimidazolium bis(trifluoromethylsulfonyl)imide [EMIM+Tf2N-] hydrophobic ionic liquid on nano-silica sorbents for removal of lead from water samples" (Accessed Oct. 11, 2020).

* cited by examiner

ELECTRICITY GENERATION FROM LOW GRADE WASTE HEAT

CROSS-REFERENCE TO RELATED APPLICATION

The present application claims priority to and the benefit of U.S. Provisional Patent Application No. 62/646,612 filed Mar. 22, 2018, which application is herein incorporated by reference in its entirety.

BACKGROUND OF THE INVENTION

1. The Field of the Invention

The present invention is in the field of electricity generation, more particularly electrical generation from low grade heat using directional solvent extraction (DSE) combined with any of various processes for generating electrical power from the resulting salinity gradient.

2. The Relevant Technology

The ability to harvest low-grade waste heat has been historically challenging and has attracted intensive research activities. A main technology is solid-state thermoelectric generation, but its deployment is currently hindered by problems including low efficiency and reliability of thermoelectric materials, as well as high costs. Thermal charging of batteries is another technology that can potentially convert low temperature heat to electricity, but such technologies are still in the very early stages of research, and involve the use of exotic materials that are available in only small quantities.

Use of a salinity gradient to generate electricity may be possible, e.g., relying on the salinity difference between river water and seawater. However, a major challenge in such systems would be the expense of the membranes used in such plants. Use of natural water streams necessitates stringent pre-treatment of such water streams before introduction into the system, and bio-fouling of the membrane is unavoidable, as a practical matter. In addition, such plants are limited by the salinity difference (about 3.5%) between the available seawater and river water sources.

As such, there exists a continuing need for improved systems which may offer greater efficiency, greater simplicity, and lower costs.

BRIEF SUMMARY OF THE INVENTION

The present invention is directed to systems for generating electricity from low grade (e.g., waste) heat. The system may couple a directional solvent extraction process with any of various processes for generating electricity from a salinity gradient that is generated during the direction solvent extraction portion of the system. One such process for electrical generation from a salinity gradient may include a pressure retarded osmosis process. Another may include a reverse electro-dialysis process. In an implementation, the system may include a heated medium salinity liquid stream (e.g., including water, a salt, and an ion-stripping liquid), a first separation tank for separating the medium salinity liquid stream into a high salinity liquid stream including an elevated concentration of the salt, and a supernatant stream that includes the water and the ion-stripping liquid. The supernatant stream may include little if any of the salt. The first separation tank may include a first outlet for extracting the high-salinity liquid stream from the separation tank, and a second outlet for extracting the supernatant stream from the separation tank. A second separation tank may also be provided for separating the supernatant stream into a low salinity liquid stream including water, and an ion-stripping liquid stream including the ion-stripping liquid. The first separation tank may operate at an elevated temperature (e.g., where contents are heated by low grade heat, for example to 40-80° C.), while the second separation tank is at a lower temperature (e.g., at 20° C. to 40° C.). By way of example, the difference in temperature between such separation tanks may be at least 5° C., at least 10° C., such as from 10° C. to 50° C., or 15° C. to 40° C.

The high salinity liquid stream and low salinity liquid stream as generated from the directional solvent extraction portion of the process can be fed into a variety of systems configured to use the salinity gradient between such streams to generate electricity. For example, one such system may be configured as a pressure retarded osmosis ("PRO") process. Another system may be configured as a reverse electro-dialysis ("RED") process. Various other processes for generating electricity from a salinity gradient may alternatively be used, as will be apparent to those of skill in the art. In a PRO process (or any of the processes relying on the salinity gradient to generate electricity), a first chamber may be provided for receiving the low salinity liquid stream, and a second chamber for receiving the high salinity liquid stream, where the first and second chambers are separated by a semipermeable membrane. The semipermeable membrane may allow flow of water therethrough, but not the salt. In a PRO process, because the low salinity liquid in the first chamber includes substantially pure water, water will follow the salinity gradient, flowing into the high salinity liquid of the second chamber, which will cause the pressurization of the liquid in the second chamber. The theoretical water potential, e.g., between even pure water and sea water (e.g., with about 4% salinity) is about 26 bars. The pressurized high salinity solution can be used to drive a hydroturbine, generating electrical power. After such power generation, the high and low salinity streams may exit the chambers of the osmosis process, to be combined, for mixing with the ion-stripping liquid, starting the process again. It will be apparent that such a process can be carried out as a "continuous" (rather than batch) process, as that term is understood by those of skill in the engineering art. The system can also work in a closed loop, where risk of bio-fouling and other contamination of any membrane is reduced or minimized. As the working fluid is completely cycled (with no additions) there is no need for any pre-treatment.

A reverse electro-dialysis ("RED") process may also be used to generate electricity from the salinity gradient. A RED process or module may similarly include a first chamber for receiving the low salinity liquid stream, and a second chamber for receiving the high salinity liquid stream, where the first and second chambers are separated by a semipermeable membrane. Each chamber may include an electrode therein, configured to generate electricity through ion exchange and reaction at the electrodes of the RED module. Combinations of such processes (e.g., a PRO process and an RED process) could also be used for electricity generation. As in the previously described PRO process, exit streams of the low salinity liquid stream and the high salinity liquid stream from the chambers may subsequently be mixed with the ion-stripping liquid stream, starting the process again.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

DETAILED DESCRIPTION OF THE PREFERRED EMBODIMENTS

I. Definitions

Figure 1:
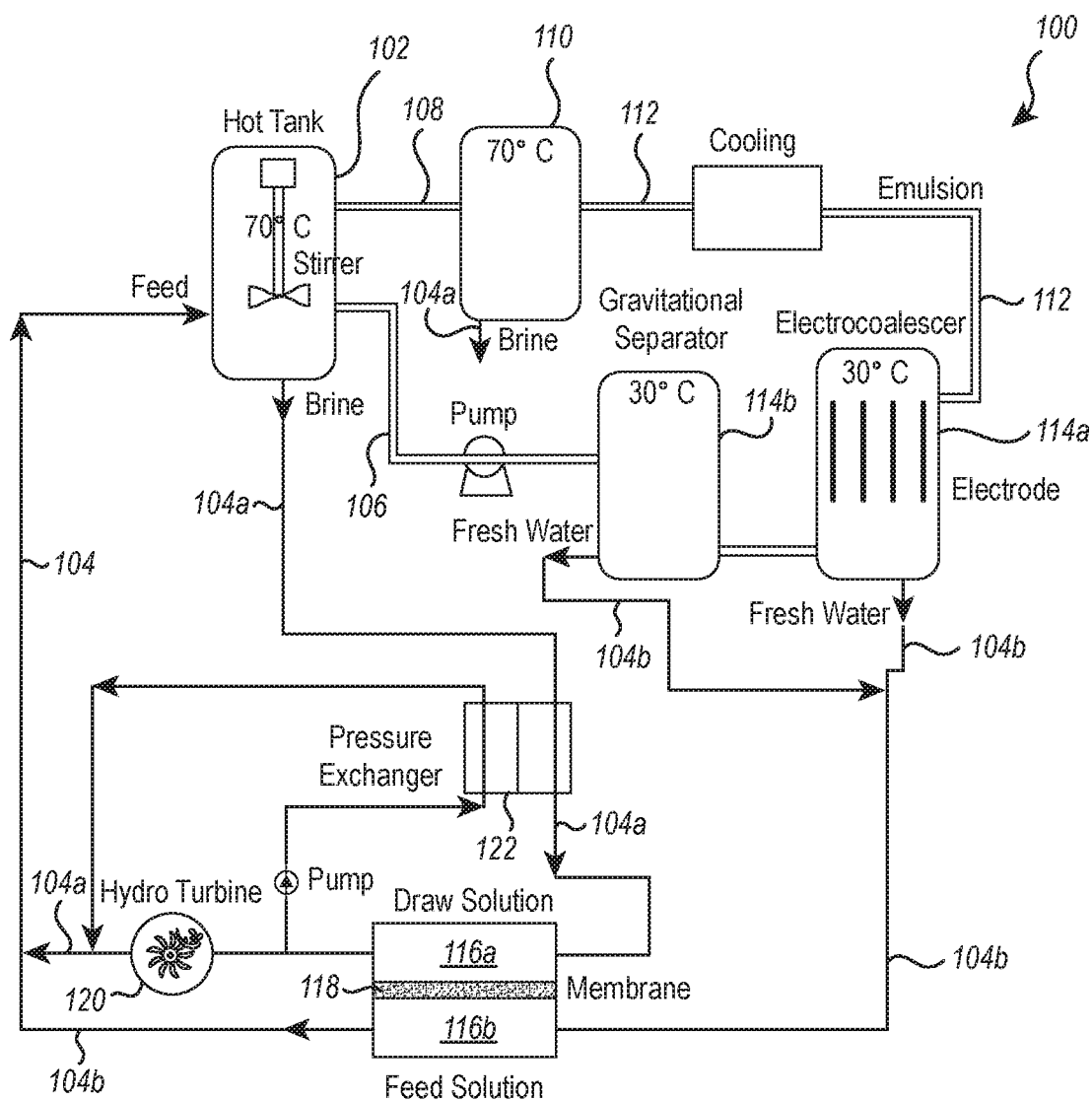
FIG. 1 schematically illustrates an exemplary process that combines directional solvent extraction (DSE) and pressure retarded osmosis (PRO) for electrical power generation from low grade waste heat.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising," which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

Unless otherwise stated, all percentages described herein are by weight.

In some embodiments, the films and compositions described herein may be free or substantially free from any specific components not mentioned within this specification. By 'substantially free of' it is meant that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

The present invention is directed to systems for generating electricity from low grade (e.g., waste) heat. The system may couple directional solvent extraction (DSE) with one or more processes for generating electricity from the salinity gradient that results from the DSE portion of the process. One such process may include a pressure retarded osmosis ("PRO") process. Another may include a reverse electrodialysis ("RED") process. In an implementation, the system may include a heated medium salinity liquid stream (e.g., including water, a salt, and an ion-stripping liquid), a first separation tank for separating the medium salinity liquid stream into a high salinity liquid stream including an elevated concentration of the salt, and a supernatant stream that includes the water and the ion-stripping liquid. Substantially all of the salt may be in the high salinity liquid stream, such that the supernatant stream may include little if any of the salt. The first separation tank may include a first outlet for extracting the high-salinity liquid stream from the separation tank, and a second outlet for extracting the supernatant stream from the separation tank. A second separation tank may also be provided for separating the supernatant stream into a low salinity liquid stream including water, and an ion-stripping liquid stream including the ion-stripping liquid. The first separation tank may operate an elevated temperature (e.g., 40-80° C., as heated by the low grade heat), while the second separation tank is at a lower temperature (e.g., at or near ambient temperature, such as 20°–40° C. or 25°–40° C.). The difference in temperature between the first and second separation tanks may be at least 5° C., at least 10° C., such as 15° C. to 40° C.

The high and low salinity liquid streams can be fed into any desired process for generating electricity, using the salinity gradient provided by such streams exiting from the DSE portion of the process. In a PRO process, the two streams are fed into chambers that are separated by a semipermeable membrane, which because of the salinity gradient, allows water from the low salinity chamber to flow into the high salinity chamber, raising the pressure of the high salinity chamber significantly. For example, the theoretical pressure gradient than can be generated based on even a 3.5% to 4% salinity gradient (pure water versus seawater) is 26 bars. The generated pressure can be used to drive a hydroturbine, generating electricity.

In a RED process, the two streams embodying the salinity gradient can be fed into respective chambers, also separated by a semipermeable membrane, where electrodes are provided within each of the chambers, electrically connected to one another. Electrical current flow will result between the electrodes, because of the salinity gradient between the two chambers.

In any such process, electrical generation efficiency may be at least 3.6%, greater than 3.6%, such as at least 4%, at least 4.25%, at least 4.5%, at least 4.75%, such as 3.7% to 10%, 4% to 10%, 4.5% to 8%, 4.5% to 7%, or 4.5% to 6%.

III. Exemplary Systems and Processes

FIG. 1 illustrates an exemplary system and process 100 for generating electricity from low grade heat, such as waste heat, solar heated water or another solar heated fluid, or the like. For example, such low grade heat may be at a temperature of no more than 100° C., no more than 95° C., no more than 90° C., no more than 85° C., or no more than 80° C. Such low grade heat may be in the form of a warm waste stream, e.g., of an industrial or other process (e.g., a heated waste water stream or the like). Such temperatures of the stream may also be achieved in other ways, e.g., through solar heating or the like. The present systems provide a mechanism to harvest the energy in such low grade heat streams, to generate electricity, in a closed loop system that does not require any inputs, and generates no waste material outputs. Even though low grade heat may be used in heating components used in the present process, it will be understood that in some embodiments, heating to higher temperatures could also be employed, e.g., using other heat sources (e.g., combustion of fuels). By way of example, low grade heat in the form of solar heating or warm industrial process water (e.g., water typically fed to a cooling tower) could be used to heat components to a first temperature (e.g., to 40° C., 50° C., 60° C., 70° C. or the like), while a higher temperature could then be achieved using another source of heat (e.g., combustion of fuel or the like), e.g., heating to a given highest process temperature that may be at a higher temperature than may be obtainable from the low grade heat. The highest process temperature of the present systems may be, e.g., from 40-80° C., from 50-80° C., from 60-80° C., or from 70-80° C.

The system and method may be configured as a closed loop (i.e., a sealed system), so as to recycle the same fluid (e.g., liquid) materials continuously, without requiring input of any materials into the closed loop throughout operation of the system or method. For example, the system and method may employ a liquid stream that includes water and an organic ion stripping liquid (ISL) (also referred to herein as a directional solvent), and a salt that is dissolvable into the water. Although water is principally described as the solvent into which the salt is dissolved, it will be appreciated that other liquids may potentially be used, under the same principle.

When the liquid mixture of the salt, water, and the ion-stripping liquid is heated (e.g., using the low grade heat), water molecules dissolve more readily (i.e., preferentially) into the ISL, due to the increased solubility of the water in the ISL, at increased temperature. The salt preferably has little if any solubility in the ISL. For example, any solubility of the salt in the ISL may be substantially zero, and negligible relative to the solubility of the salt in the water, in order to ensure that the salt remains substantially with the water phase, rather than in the ISL upon separation of the two. For example, the solubility of the salt in the ISL may be no more than 3%, no more than 3%, no more than 2%, no more than 1%, no more than 0.5%, no more than 0.3%, no more than 0.1%, no more than 0.05%, no more than 0.01%, no more than 0.005%, or no more than 0.001% of the solubility of the salt in the water or other solvent employed in its place. In addition, the greater the increase in solubility of the water in the ISL across the temperature differential that can be achieved using the low grade heat (and/or other heating), the more efficient the overall process will be. In an example, the difference in solubility of the water in the ISL may be at least 10%, at least 25%, at least at least 30%, at least 40%, at least 50%, at least 100%, at least 200%, at least 300%, at least 500%, at least 800%, at least 1000%, or at least 1500%. Defined another way, the difference in such solubility may be at least 5 percentage points, at least 10 percentage points, at least 15 percentage points, at least 20 percentage points, at least 30 percentage points, such as 10 to 50 percentage points. For example, if the solubility of water in the ISL is 10% at the lower process temperature (in the second separation tank 114), it may be at least 30%, at least 40%, or at least 50% at the highest process temperature (in the first separation tank 110).

While many existing systems that may employ similar principles (e.g., in desalination or the like) are limited in the choice of salt materials, or choice of ISL employed, greater freedom in selection of such materials may be possible in the following context, where drinking or agricultural irrigation water is not being produced. For example, the ISL and/or salt need not be non-toxic, as the system is closed, and the water streams are not being used for human, animal or plant consumption. Similarly, the ISL need not be entirely or substantially undissolvable in the water or other solvent used. In some embodiments, the selected ISL may exhibit some miscibility in the water or other solvent, but will still exhibit a differential in solubility at the different temperatures of the two separation tanks, so as to be able to create a salinity gradient between the high salinity stream exiting the first separation tank and the low salinity stream exiting the second separation tank.

Exemplary ion stripping liquids that may be suitable for use, as they may provide for relatively large differences in solubility in water as a function of temperature (e.g., particularly where such pronounced difference is at the contemplated temperature ranges between 25° C. and 100° C., such as 30° C. and 80° C. or the like) include a variety of organic compounds including, but not limited to organic acids, other fatty acids, amino acids, amines, alcohols, ionic liquids, and mixtures thereof. Exemplary organic acids may be carboxylic acids with an aliphatic chain or other carbon chain (e.g., alkenes, alkynes), which may be saturated or unsaturated. Any such carbon chain of such acid or an alcohol may include at least 4 carbon atoms, such as 4 to 20 carbon atoms, 6 to 14 carbon atoms, 6 to 12 carbon atoms, or 6-10 carbon atoms (e.g., 6, 8, 10, or 12 carbon atoms). Aromatic or other cyclic organic compounds (e.g., cyclohexane, heterocyclic compounds, etc.) may also be suitable for use. In addition to such carboxylic acids, various diglycerides, triglycerides or other fatty acid esters, or various other organic compounds which exhibit the desired solubility differential between a low and high process temperature may also be suitable for use. The ISL may be a liquid at both ambient temperature (e.g., 20-25° C.), as well as at the elevated temperature to which heating is achieved using the low grade heat (e.g., at up to 90° C., or 80° C., or 70° C., for example).

Ionic liquids refer to ionically bound compounds (where at least eh anion is typically organic, including carbon-carbon bonds) where the anion is ionically bound to the cation, but which are in a liquid state at the contemplated temperatures (e.g., melting temperature below 100° C., below 90° C., below 80° C. or below whatever the highest process temperature of the present process is), such that the ionic liquids are liquid at the contemplated process temperatures and conditions. Examples of such materials include compounds based on imidazoles substituted at the 1 and 3 positions with an alkyl group (e.g., 1-alkyl-3-alkylimidazoliums) such as 1-alkyl-3-methylimidazoliums, such as the 1-ethyl-3-methylimidazolium (EMIM) cation. EMIM has the structure shown below.

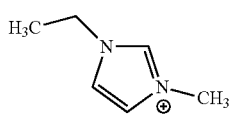

Exemplary ionic salts, some of which are based on EMIM, include EMIM:Cl, EMIM dicyanamide, EMIM.Tf2N, 1-butyl-3-methylimidazolium hexafluorophosphate ([BMIM]:PF$_6$) and 1-butyl-3,5-dimethylpyridinium bromide. It will be apparent that at least some such ionic salts may include a cation based on an imidazole group, a pyridinium group, or other heterocyclic group. Such imidazole pyridinium, or other heterocyclic anion may be substituted. Various other cations may be used, so long as the resulting salt is liquid at the contemplated processing temperatures, and can be used as described herein to generate a high and low salinity stream because of significantly increased solubility in water or another solvent or carrier at different temperatures.

Additional exemplary cations that may be useful include one or more of the following cations.

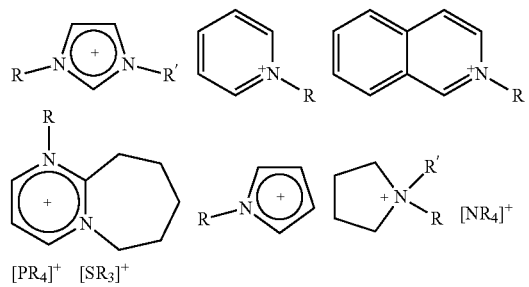

Additional exemplary cations may include 1-alkylpyridinium, N-methyl-N-alkylpyrrolidinium and ammonium ions, or phosphonium Exemplary anions include various halides and halogenaluminates, such as hexafluorophosphate, tetrafluoroborate, bistriflimide [CF$_3$SO$_2$)$_2$N]$^-$, bis(trifluoromethylsulfonyl)imide (Tf2N), other imides, triflate, and tosylate. Various organic anions, such as formates, alkylsulfates, alkyphosphates, glycolates and the like may also be suitable. Of course, any selected ionic liquid will be stable at the temperatures, and in compositions as described for cycling herein.

While sodium chloride is an exemplary salt that may be used, it will be appreciated that other salts may also be suitable for use, and may provide for even higher salt loading differentials. The salt will be soluble in water (or whatever liquid is used in place thereof). Any of various salts may also be suitable for use in the process. Exemplary salts may include various halides, sulfates, phosphates, acetates, nitrates, perchlorates, carbonates, hydroxides, or other anions. Exemplary salts may exhibit complete or at least relatively high solubility in water. Some carbonates, or hydroxides having sufficient solubility may also be used. Exemplary cationic portions for the salt may include an alkali metal (e.g., sodium, potassium, lithium etc.), an alkaline earth metal (e.g., calcium, magnesium, etc.), an ammonium or other cations. Combinations of salts may be used. Examples of suitable salts may have a solubility in the water (or other solvent used) of at least 5% by weight (e.g., at the given process temperature(s)).

Preferred ISL materials and salts will facilitate creation of a large salt loading differential upon heating the medium salinity liquid stream (including water, the salt, and the ISL), upon such stream's separation into the supernatant phase and the high salinity liquid phase. Such salt loading is measured between the salt loading of the high salinity liquid phase (e.g., greater than that of seawater, such as greater than 5%, at least 8%, or at least 10% salt loading, such as 10% to 50% salt loading by weight) as compared to the low salinity liquid phase that separates out from the supernatant phase upon cooling (e.g., in the second separation tank). The low salinity liquid phase may include negligible salt content (e.g., consist of substantially pure water).

For example, in the case of octanoic acid or an ionic liquid as the ISL and sodium chloride as the salt, sufficient water from the mixture is dissolved in the ISL to result in a significant increase in dissolved salt content in the water phase of the mixture. Upon gravity induced separation, the mixture may separate into a high salinity water phase (e.g., at the bottom of the separation tank) and a supernatant phase that includes the ion-stripping liquid, with water dissolved therein. This separation tank may be maintained at a relatively high temperature (e.g., 60° C.-100° C., 65° C. to 90° C., or 70° C. to 80° C.), e.g., achieved by heating using the low grade heat. In an example, the high salinity water phase may include about 15% salt by weight. Because the supernatant phase includes little if any salt (e.g., no more than 1%, no more than 0.5%, no more than 0.2%, no more than 0.1%, or no more than 0.05% by weight), this supernatant can be separated into a low salinity water phase and a phase including the ion-stripping liquid and some dissolved water, by simply cooling the supernatant phase (e.g., to 25° C. to 50° C., or 30° C. to 40° C.), and allowing it to settle, e.g., in a second separation tank 114a/114b, e.g., at such reduced temperature. The low salinity water phase may include, e.g., only 0.05% or less salt, i.e., it may consist substantially of water.

The low salinity water phase (which may also be relatively cool) and the high salinity water phase (which may be warmer) may be fed into a pressure retarded osmosis process, a reverse electro-dialysis process, or another process which is able to use the salinity gradient differential to produce electricity. Such a combined process which uses low grade (e.g., waste or solar) heat to create the salinity gradient, followed by use of such salinity gradient to generate electricity provides a beneficial use for such low grade heat, which is often otherwise considered useless, as a waste product. In addition, such processes may be suitable for use in environments where electrical power from an electrical grid may be unavailable, very expensive, unreliable, or the like. The described systems may be relatively compact, e.g., so as to perhaps even be portable (e.g., a truck or trailer mount system), or for use in an individual home or building, so as to provide electrical power to such home or building in such environments where electrical power may otherwise be difficult to access.

Regeneration of a medium salinity liquid stream 104 can be achieved, for starting the process 100 again, by simply drawing off appropriate amounts (e.g., equal to the input of both streams into the power generating portion of the system) from the high and low salinity streams 104a, 104b, and combining these exit streams of high and low salinity streams to form that portion of the medium salinity stream 104 that is made up of the salt and water. This medium salinity stream can of course be mixed with the ion-stripping liquid (e.g., from the second separation tank) stream 106, to regenerate the medium salinity stream that includes the water, salt, and ion-stripping liquid, for cycling through the process again (e.g., into first separation tank 110, after mixing all streams together in mixing tank 102).

Because the system is closed, the same liquid materials can be cycled through the system continuously, and indefinitely. Thus, there is no need to add any outside material to the system, which greatly reduces the risk of fouling of any membrane (e.g., semipermeable membrane) in the PRO process, RED process, or other osmotic process for producing electricity. For example, neither river water nor seawater need be used, and such would actually be undesirable in the present system, as such materials include biological materials therein, which will invariably result in increased fouling of such membrane, as well as fouling of various surfaces within other components of the system (e.g., piping, settling tanks, heat exchanger surfaces, etc.). The streams used may be sterile, so as to avoid such microbial or other biological fouling. The sealed, closed nature of the present system and method is particularly advantageous. The continuous operation of the system (e.g., as opposed to a batch process) is also advantageous, whereby the same material may be cycled throughout the system indefinitely, without requiring any material inputs.

Referring again to FIG. 1, an exemplary process and system 100 may include a mixing tank 102 in which the high salinity stream 104a and the low salinity stream 104b are mixed with the ion stripping liquid stream 106. As shown, high and low salinity streams may be premixed into a medium salinity stream 104 (prior to addition of the ISL stream 106) before reaching mixing tank 102. The medium salinity stream 108 including water, salt, and ISL may be fed to a first (e.g., high temperature) separation tank 110, for separation into a high salinity stream 104a (i.e., "brine"). Such high salinity brine stream 104a may also be taken from mixing tank 102. Separation tank 110 also produces a supernatant stream 112, which may be substantially free of the salt, such that the stream 112 may include water and the ISL. Such stream may be cooled from the hot processing temperature of the first separation tank (e.g., at 40° C. to 80° C., such as from 70° C. to 80° C.), e.g., cooled down to about 30° C. (e.g., 25° C. to 40° C.), or even lower if ambient temperature permits such (e.g., 10° C. to 20° C.). Such cooled supernatant stream 112 may be fed into a second separation tank 114 (FIG. 1 shows a series of 2 separation tanks, including an electrocoaleser 114a followed by separation tank 114b). Treatment with such an electrocoalescer may improve the efficiency of separating the fresh water from the ISL. For example, it may reduce separation time by more than 10× (e.g., from 10× to 100×, as compared to gravity separation alone). The water stream 104b may compositionally be substantially pure water. The separated ISL stream 106 from the second (low temperature) separator 114b is then ready to be returned to the mixing tank 102, for starting the process again.

Either or both separation tanks 110, 114b, as well as any of the mixing tank 102, and/or electrocoalescer 114a may be insulated, in order to aid in maintaining the desired temperature of the particular tank or other device. In the first separation tank 110, it is desired to maintain the elevated temperature (e.g., 40° C.-80° C., such as 70° C.-80° C.) achieved in the heated mixing tank 102 or other heat exchanger, in order to increase the salt loading in the high salinity liquid phase that eventually separates from the supernatant. For this reason, the separation tank 110 may be insulated, and/or may be actively heated, where desired. The second separation tank 114b is maintained at a lower temperature (e.g., about 30° C.) as compared to the first separation tank 110, as here it is desired to cause the water in the supernatant stream 112 to fall out of solution, and form the low salinity liquid phase (stream 104b) at the bottom of the second separation tank 114b as it does so.

FIG. 1 illustrates feeding of the high salinity liquid stream 104a into a pressure retarded osmosis process, where stream 104a and low salinity liquid stream 104b are fed into first and second chambers 116a, 116b, respectively, separated by a semipermeable membrane 118. Because of the salinity gradient provided between such streams, (and chambers 116a and 116b), water from chamber 116b will flow through membrane 118 into chamber 116a, increasing the pressure of the liquid in chamber 116a. The salt will remain in chamber 116a. Such pressurization (gauge pressure) may be significant (e.g., at least 1 bar, at least 3 bars, at least 5 bars, at least 10 bars, such as 1 bar to 50 bars, or 1 bar to 30 bars, or 1 bar to 10 bars as compared to chamber 116b, which may simply be at or near atmospheric pressure. This pressurized stream 104a exiting chamber 116a may be used to drive a turbine 120. Such stream 104a may also be used to increase the pressure of the high salinity liquid stream coming from the directional solvent extraction (DSE) portion of the process, prior to introduction of such stream 104a into chamber 116a, e.g., as shown in pressure exchanger 122.

After use in driving turbine 120, the high salinity liquid stream 104a may be conveyed for mixing with low salinity liquid stream 104b, e.g., as mixed stream 104, towards mixing and heating tank 102.

In an embodiment, the weight fraction of ion-stripping liquid in the medium salinity stream being fed into the first separation tank 110 (e.g., which includes the water, salt and ion-stripping liquid) may be greater than 30%, greater than 40%, or greater than 50%, such as 50-70%. The water and salt may thus account for less than a majority of the medium salinity stream (e.g., less than 50%, such as about 40% by weight). The salt may account for about 5% to about 40%, 5% to 30%, or 5% to 28% by weight of the medium salinity stream, while the water may account for 50% to 95%, 60% to 95%, 70% to 95%, or 72% to 95% by weight of the medium salinity stream.

Figure 11:
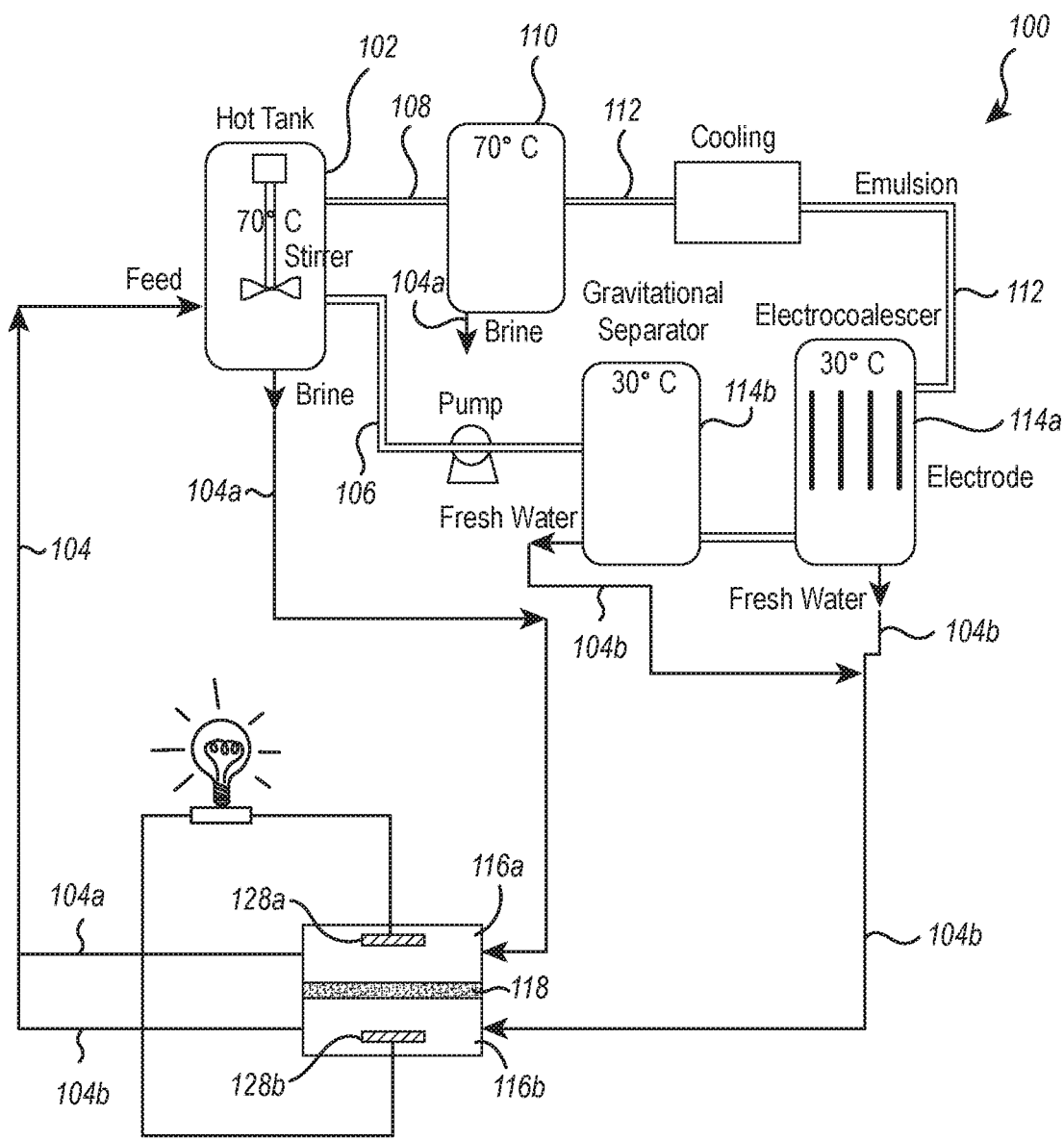
FIG. 11 schematically illustrates an exemplary process that combines directional solvent extraction (DSE) and reverse electro-dialysis for electrical power generation from low grade waste heat.

The illustrated pressure retarded osmosis process of FIG. 1 is merely one example of a process that may use the salinity gradient produced by the directional solvent extraction (DSE) process to produce electrical power. FIG. 11 illustrates coupling of the DSE process as in FIG. 1 with a reverse electro-dialysis (RED) process portion to produce electricity. For example, such process is otherwise similar to that of FIG. 1, but chambers 116a and 116b are shown as including electrodes 128a and 128b positioned therein, respectively. Because of the salinity gradient between chambers 116a and 116b, electrical current will flow from one electrode to the other, as a generated electrical current. It will be apparent that in such an embodiment, the salt selected will need to be suitable as an electrolyte in such solutions in chambers 116a, 116b, for electrical generation to occur. Exemplary appropriate electrode materials for electrodes 128a, 128b may include, but are not limited to, various electrically conductive metal materials. In an embodiment, the electrodes may include a Ag/AgCl or Ti—Ru—Ir electrode. It will be apparent that various other electrical generation processes may be used to convert the salinity gradient into electrical power.

By way of example, in an embodiment, medium salinity stream 104 before mixing with the ISL stream may include 1.5% to 14% salt and 86-98.5% water. High salinity stream 104a may include 3% to 28% salt and 72-97% water. Ion stripping stream 106 may include 1-5% water and 95-99% ion stripping liquid. Low salinity stream 104b may include 99.9 to 100% water (e.g., less than 0.1% salt). Mass balances could be performed on the system (e.g., of FIG. 1, 5, 7 or 11) using the above and the exemplary mass flow rates of Table 1, to derive exemplary composition information for any of the system streams.

Various calculations were performed relative to the process seen in FIG. 1. In such calculations, the salt permeability and concentration polarization were neglected in the PRO process when calculating power generation.

The feed flow rate fraction is defined as the ratio between flow rates of feed solution (fresh water produced from DSE—stream 104b, in chamber 116b) and the mixed feed and draw solution (mixture of brine and fresh water in chamber 116a). An optimal feed flow rate fraction exists which can yield the maximum specific power generation. The optimal initial feed flow rate fraction can be calculated as follows:

$$\phi_{op,CT}(\Delta P) = \frac{c_F^*}{c_{D,0} + c_{F,0}} = \frac{c_{D,0} - \Delta P/(vRT)}{c_{D,0} + c_{F,0}}$$

where $c_F^*$ is the critical feed concentration. In the PRO module the feed concentration increases due to the salt permeability, and the driving force of the PRO vanishes as $c_F$ approaches $c_F^*$. $c_{D,0}$ is the initial draw concentration. $c_{F,0}$ is the initial feed concentration. $\Delta P$ is the applied hydraulic pressure. R is the universal gas constant; T is temperature. v is Van't Hoff's constant. For example, for NaCl solution, v is 2.

The maximum specific power generation (power generation per unit volume of mixed feed and draw solution) is:

$$w_{max,CT}(\Delta P) = \Delta P \frac{c_{D,0} - c_{F,0} - \Delta P/(vRT)}{c_{D,0} + c_{F,0}}$$

The corresponding optimal initial flow rate fraction is $\phi_{op,CT}(\Delta \pi/2)=0.5$ for counter-current flow, i.e., an optimal volume fraction of the feed solution and the mixed solution may be 0.5 (i.e., so that equal volumes of stream 104a and 104b are being fed into chambers 116a and 116b, respectively). The resultant maximum specific power generation (power generation per volume mixing solution) is:

$$w_{max,CT}^* = \frac{vRT}{4} \frac{(c_{D,0} - c_{F,0})^2}{c_{D,0} + c_{F,0}}$$

To achieve the optimal volume fraction, the recovery ratio of the DSE process may be designed to be about 0.5. For example, the recovery ratio may be from about 0.4 to about 0.6, or from 0.45 to about 0.55. The concentrated brine and purified water produced in the DSE process (as streams 104a and 104b, respectively) are channeled as draw solution and feed solution to the PRO process, into chambers 116a and 116b, respectively.

Figure 2:
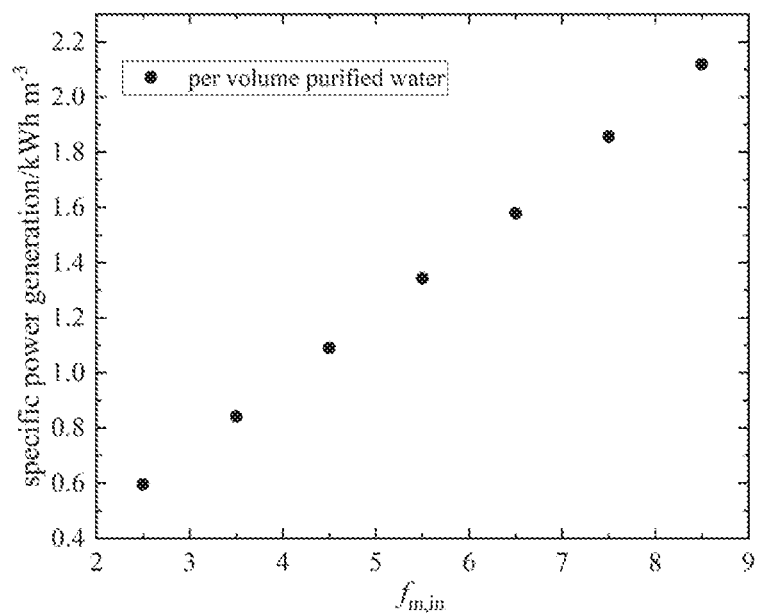
FIG. 2 shows how salt concentration of the input solution to the DSE affects specific power generation (kWh/m$^3$ of fresh water).

The influence of the input saline salt concentration of the DSE process (the feed stream 104 into tank 102 in FIG. 1) on the ultimate PRO specific power generation is shown in FIG. 2. As shown, as the input solution concentration increases, the specific power generation increases linearly.

Below is provided an analysis of the DSE process to estimate the thermal energy needed to produce 1 m³ of fresh water.

DSE process: water yield Y: the ratio of mass flow rate of purified fresh water and the directional solvent (the ion stripping liquid) is $$Y = \frac{m_w}{m_{so}}$$

Recovery ratio RR: the mass flow rate of purified fresh water (stream 104b out of DSE) to mass flow rate of saline (stream 104a out of DSE) is $$RR = \frac{m_w}{m_b}$$

Figure 3:
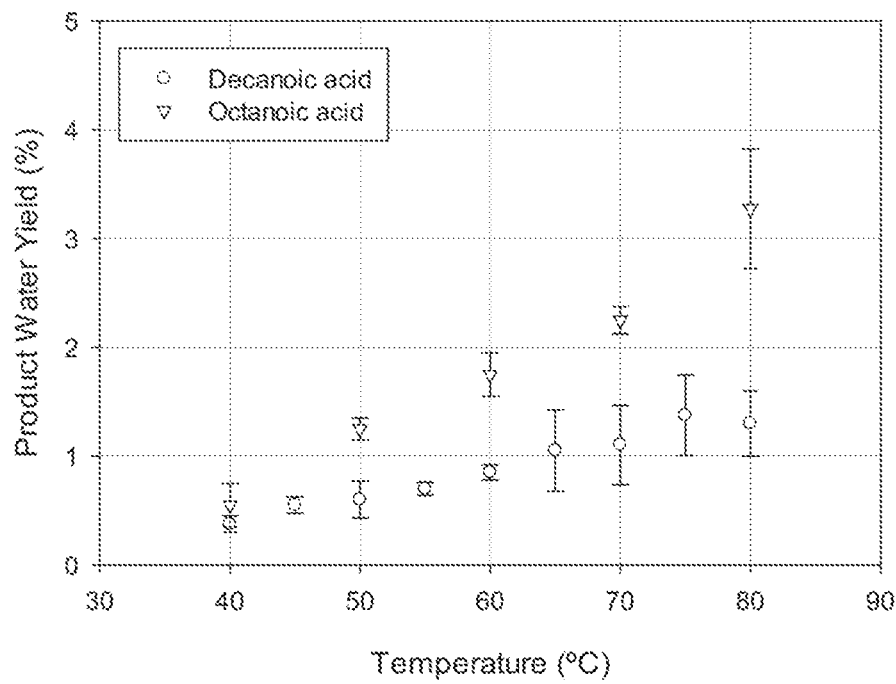
FIG. 3 shows product water yield percentage as a function of temperature, for two exemplary carboxylic acids (octanoic acid and decanoic acid).

The thermal energy consumption in the DSE process may be a key parameter influencing the efficiency of power generation. The less thermal energy needed to produce the same amount of fresh water, the higher the overall efficiency. The water yield of the DSE process determines the heat input needed per unit fresh water produced. FIG. 3 shows the water yield from the inventors earlier work (S. Alotaibi, O. M. Ibrahim, S. R. Luo, T. F. Luo, *Modeling of a continuous water desalination process using directional solvent extraction*, Desalination, 420 (2017) 114-124), incorporated herein by reference in its entirety), where octanoic and/or decanoic acid is used as the ion stripping solvent. Water yield in the present calculations is assumed to be increased by 10 times according to preliminary results from testing conducted by the inventors, using alternative ion stripping liquid solvents, such as ionic liquids, such as [EMIM][Tf2N].

The thermal energy consumption (TEC): the amount of input heat consumed to produce one unit volume of purified water.

$$TEC = \frac{Q_{in}}{V_w}$$

Electrical energy consumption that would be used in a process such as that of FIG. 1 mainly includes three parts: pump, mixing, and separation.

$$EEC_{tot} = EEC_p + EEC_m + EEC_s$$

Figure 4A:
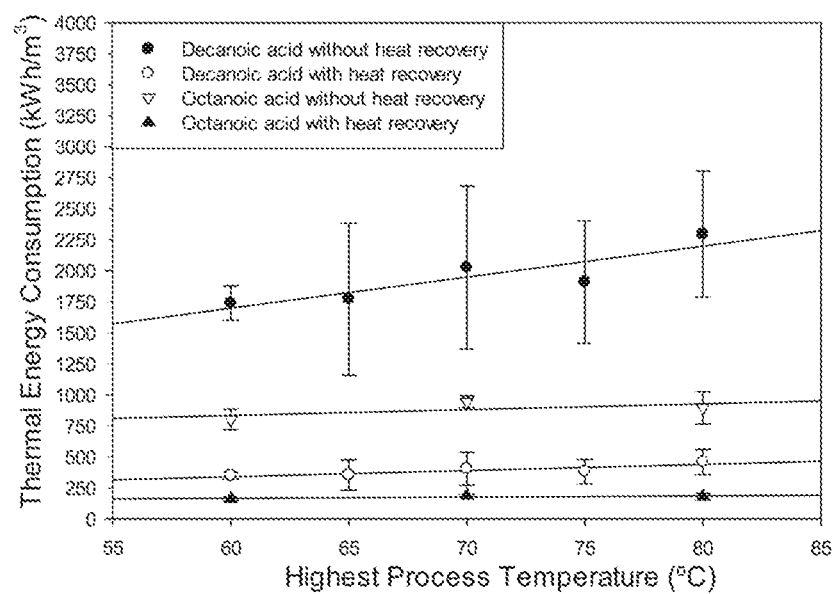
FIG. 4A shows thermal energy consumption for an exemplary process, for different organic acids, with and without heat recovery, as a function of highest process temperature.
Figure 4B:
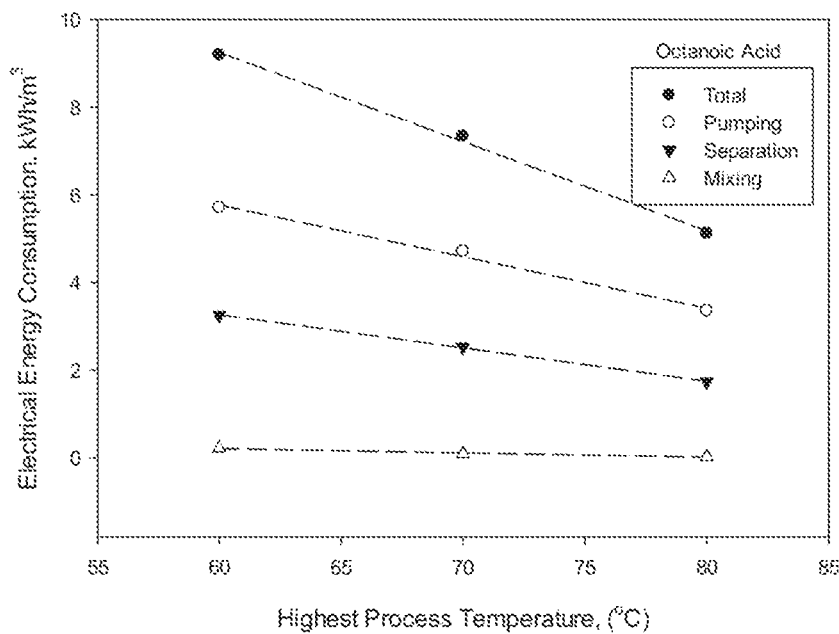
FIG. 4B shows electrical energy consumption for various portions of an exemplary process, as a function of highest process temperature.

Assuming the continuous DSE process is at steady state, the thermal energy consumption and electrical energy consumption are estimated to be as shown in FIGS. 4A and 4B.

Figure 5:
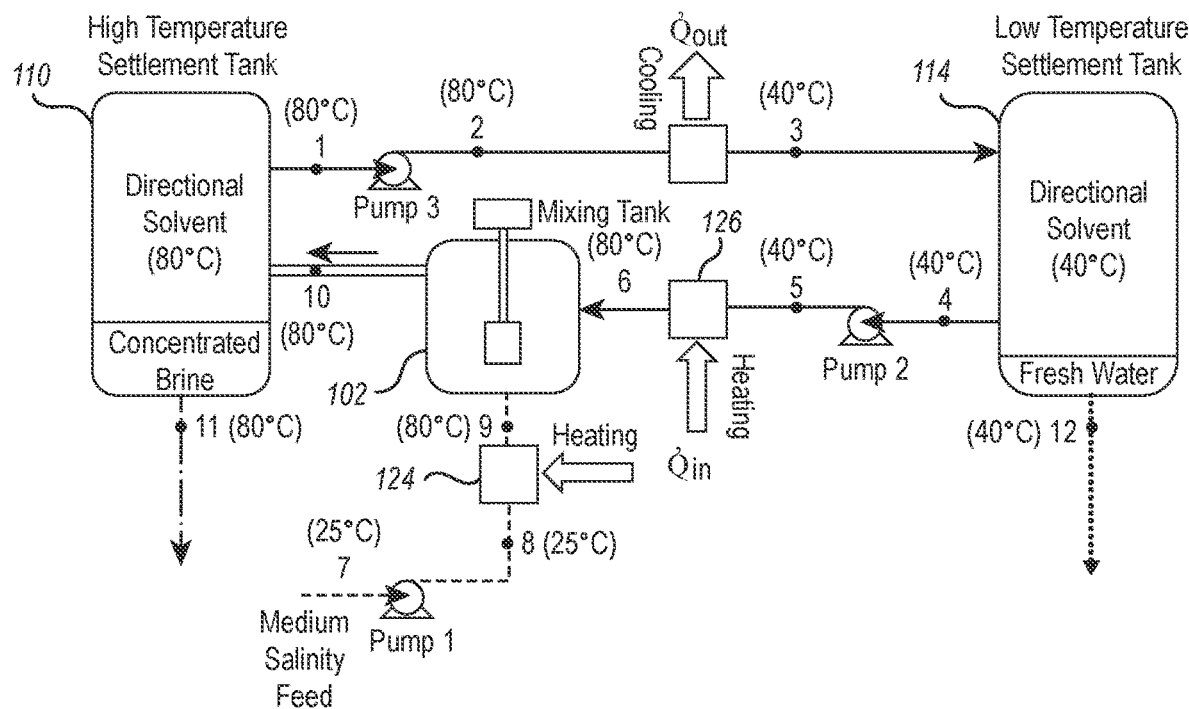
FIG. 5 schematically illustrates the DSE portion of an exemplary process, without heat recovery.

FIG. 5 shows a schematic of an exemplary continuous DSE process, such as that of FIG. 1, without heat recovery. There are two heat inputs, with one at 124 for heating the feed saline water stream 104 and one at 126 for heating the directional solvent ion stripping liquid.

Table 1 shows various thermodynamic state properties for the continuous DSE process of FIG. 5, without heat recovery, using octanoic acid as the directional solvent ion stripping liquid. The "state" markers 1-12 shown in Table 1 correspond to the locations for such markers shown on FIG. 5.

TABLE 1

| State | T (° C.) | P (kPa) | h (kJ/kg) | ρ (kg/m³) | ṁ (kg/s) | Description |
|---|---|---|---|---|---|---|
| 1 | 80 | 101 | 131.6 | 913.2 | 32.1 | Octanoic acid/water |
| 2 | 80 | 121 | 120.9 | 913.2 | 32.1 | Octanoic acid/water |
| 3 | 40 | 101 | 39.7 | 914.1 | 32.1 | Octanoic acid/water + water |
| 4 | 40 | 101 | 35.5 | 911.6 | 30.1 | Octanoic acid/water |
| 5 | 40 | 121 | 21.0 | 911.6 | 30.1 | Octanoic acid/water |
| 6 | 80 | 101 | 125.0 | 910.7 | 30.1 | Octanoic acid/water |
| 7 | 25 | 101 | 99.8 | 1023.5 | 2.0 | Sea water (salinity of 35 g/kg) |
| 8 | 25 | 121 | 99.8 | 1023.5 | 2.0 | Sea water (salinity of 35 g/kg) |
| 9 | 80 | 101 | 320.5 | 997.0 | 2.0 | Sea water (salinity of 35 g/kg) |
| 10 | 80 | 101 | 123.0 | 915.8 | 33.1 | Octanoic acid/water + concentrated brine |
| 11 | 80 | 101 | 306.7 | 1023.1 | 1.0 | Concentrated brine (salinity of 70 g/kg) |
| 12 | 40 | 101 | 167.5 | 992.1 | 1.0 | Fresh water |

Due to the increase of water yield using a directional solvent ion stripping liquid with improved properties as compared to that of octanoic acid (e.g., [EMIM][Tf2N]), the thermodynamic properties at various state points may change. In the present report, water solubility in octanoic acid at 25° C. is 1.8% and 35.8% at 80° C. (i.e., an increase of more than 1800%, or 34 percentage points). In the present calculations, any change in the properties of the mixed solution are neglected. The density and specific heat may change slightly with temperature, but can be assumed to be constant. Table 2 below shows the thermodynamic state properties after increasing the water yield by 10 times.

TABLE 2

| state | T (° C.) | P (kPa) | h (kJ kg⁻¹) | ρ (kg m⁻³) | ṁ (kg s⁻¹) | Description |
|---|---|---|---|---|---|---|
| 1 | 80 | 101 | 131.6 | 913.2 | 4.11 | solvent/water |
| 2 | 80 | 121 | 120.9 | 913.2 | 4.11 | solvent/water |
| 3 | 40 | 101 | 39.7 | 914.1 | 4.11 | solvent/water + water |
| 4 | 40 | 101 | 35.5 | 911.6 | 3.11 | solvent/water |
| 5 | 40 | 121 | 21.0 | 911.0 | 3.11 | solvent/water |
| 6 | 80 | 101 | 125.0 | 910.7 | 3.11 | solvent/water |
| 7 | 25 | 101 | 99.8 | 1023.5 | 2.0 | medium salinity |
| 8 | 25 | 121 | 99.8 | 1023.5 | 2.0 | medium salinity |
| 9 | 80 | 101 | 320.5 | 997.0 | 2.0 | medium salinity |
| 10 | 80 | 101 | 123.0 | 915.8 | 5.11 | solvent/water + brine |
| 11 | 80 | 101 | 306.7 | 1023.1 | 1.0 | brine |
| 12 | 40 | 101 | 167.5 | 992.1 | 1.0 | fresh water |

The heat input is used to heat the solvent and water mixture. The mass flowrate of directional solvent needed is equal to the ratio $m_w/Y$, to produce one unit mass of purified water. The recovery ratio (RR) may be set to 0.5. The mass of the input saline can be calculated as $2m_w(m_w/RR)$. The streams are heated to the highest process temperature (e.g., 70-80° C.) and pumped into the mixing tank 102. Thus, the thermal energy input ($Q_{in}$) for the DSE process can be calculated as follows:

$$Q_{in} = \frac{m_w}{Y} \cdot (h_{so,TT} - h_{so,LT}) + 2m_w \cdot (h_{B,TT} - h_{B,LT})/\varepsilon$$

The thermal energy consumption per unit volume of fresh water produced is $$TEC = \frac{Q_{in}}{V_w} = \frac{Qin \cdot \rho_w}{m_w} = \frac{\rho_w}{Y} \cdot (h_{so,TT} - h_{so,LT}) + 2\rho_w \cdot (h_{B,TT} - h_{B,LT})/\varepsilon$$

where s is the efficiency of the heat exchanger (e.g., which may typically vary from 70% to 95%, such as 80% to about 95%.

Figure 6:
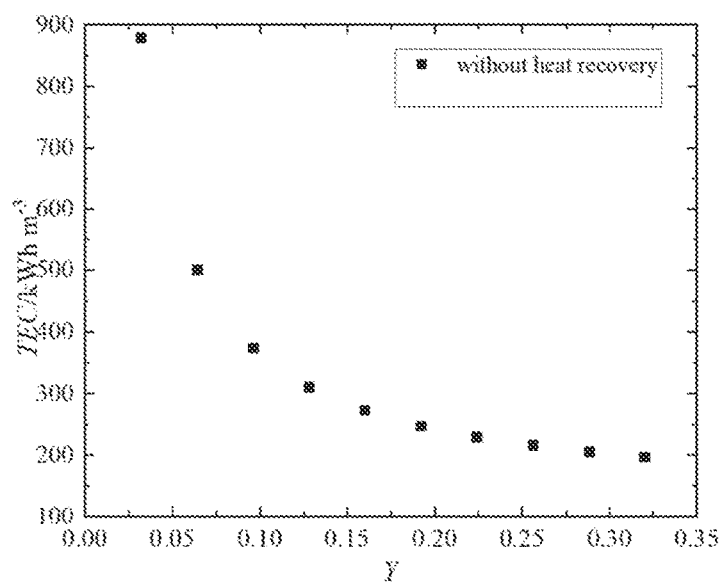
FIG. 6 shows thermal energy consumption for the process of FIG. 5, without heat recovery, as a function of water yield (Y), where the highest process temperature is 80° C. Y is defined as the ratio of (i) mass of produced low salinity water to (ii) mass of solvent used in one cycle, at a given temperature difference.

FIG. 6 shows the influence of water yield on thermal energy consumption of the DSE process without heat recovery of FIG. 5. It can be seen that thermal energy consumption decreases with water yield.

Figure 7:
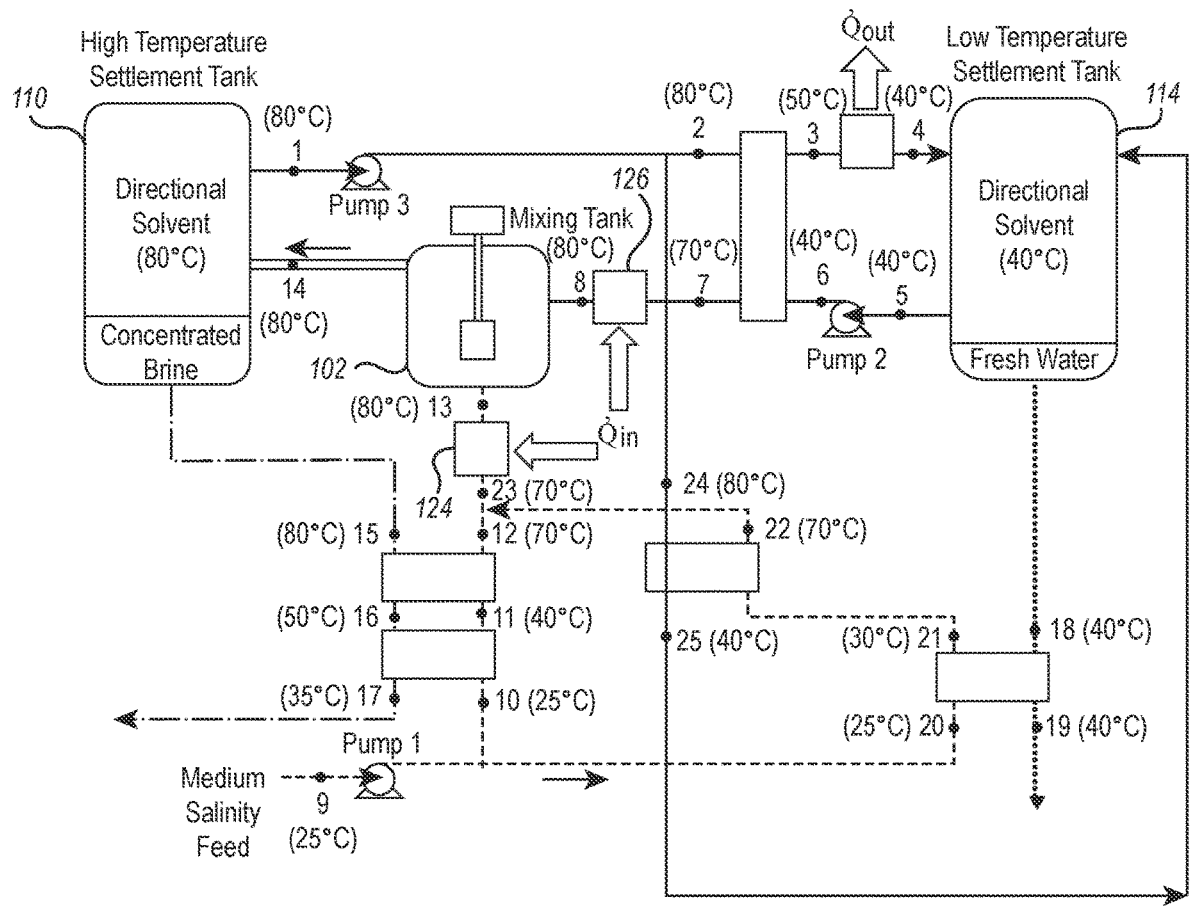
FIG. 7 schematically illustrates the DSE portion of an exemplary process, with heat recovery.

According to the configuration seen in FIG. 5, the thermal energy consumption can be calculated as follows:

State 5-6: $\dot{m}_6 h_6 - \dot{m}_5 h_5 = 3.11 \ast 125 - 3.11 \ast 21 = 323.44$ kJ s$^{-1}$ State 8-9: $\dot{m}_9 h_9 - \dot{m}_8 h_8 = 2 \ast 320.5 - 2 \ast 99.8 = 441.4$ kJ s$^{-1}$ Heat input without heat recovery: 323.44+441.4=764.84 kJ s$^{-1}$ Thermal energy consumption: 764.84*992.1 kJ m$^{-3}$=210.78 kWh m$^{-3}$ FIG. 7 shows a schematic of the continuous DSE process similar to that of FIG. 1 or FIG. 5, but with heat recovery. As shown in FIG. 7, relatively warmer streams that are being cooled can be used to heat those streams that are relatively cool, and need to be heated. Recovery of such heat, transferring it from one stream to another, greatly reduces the thermal energy consumption of the process.

Figure 8:
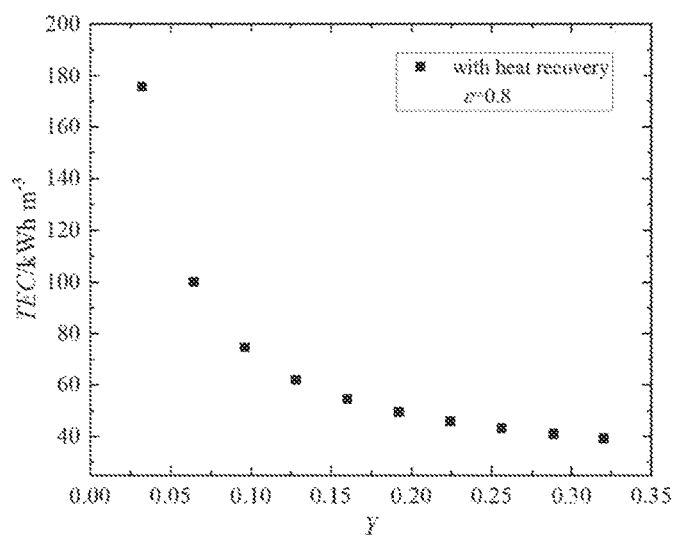
FIG. 8 shows thermal energy consumption for the process of FIG. 7, with heat recovery, as a function of water yield, where the highest process temperature is 80° C. and at a heat exchanger efficiency of 80%.

FIG. 8 shows the thermal energy consumption of a DSE process with heat recovery versus water yield (e.g., for the configuration of FIG. 7). Since all the fluids are liquids, it can be assumed that enthalpy of mixture increases linearly with temperature. The heat recovery system remains the same as in FIG. 5, which means the structure and parameters of the system do not change. FIG. 8 shows the thermal energy consumption of the DSE process with heat recovery versus water yield. It can be seen that heat recovery can lower the thermal energy consumption significantly.

Figure 9:
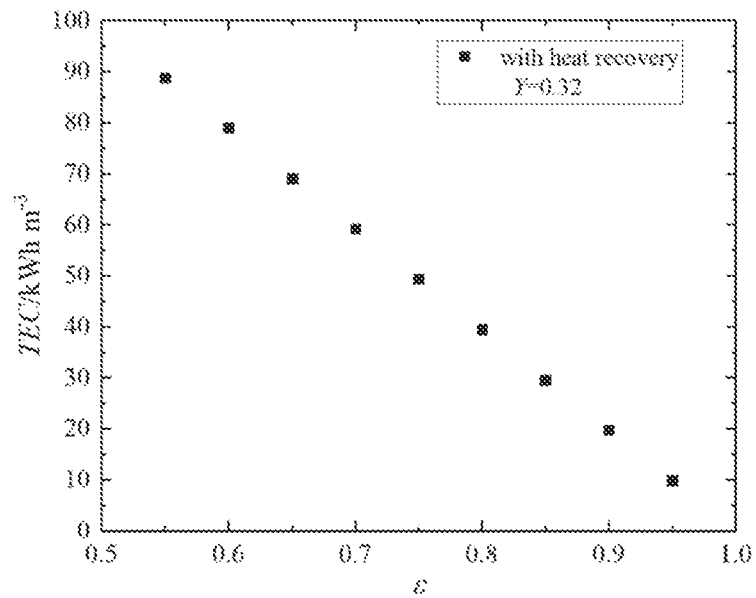
FIG. 9 shows thermal energy consumption for the process of FIG. 7, with heat recovery, as a function of heat exchanger efficiency, where the highest process temperature is 80° C. and at a water yield of 32%. Such is achievable where an ion-stripping liquid with a water yield 10× better than that of octanoic acid is used. So called ionic liquids can provide such results.

FIG. 9 shows the thermal energy consumption of DSE process with heat recovery versus heat exchanger efficiency. The thermal energy consumption decreases with heat exchanger efficiency. While yield is set at 32% in FIG. 9, it will be appreciated that yield may vary, e.g., from 5% to 50%, such as from 20% to 40%, or 30% to 35%. FIG. 6 shows how yield affects thermal energy consumption, and that higher yields generally reduce the thermal energy required by the process.

According to the configuration of FIG. 7, the thermal energy consumption can be calculated as follows:

State 7-8: $\dot{m}_8 h_8 - \dot{m}_7 h_7 = 3.11 \ast (125-21)/4 = 80.86$ kJ s$^{-1}$ State 23-13: $\dot{m}_{23} h_{23} - \dot{m}_{13} h_{13} = 2 \ast (320.5-99.8)/5.5 = 80.25$ kJ s$^{-1}$ Heat input with heat recovery: 80.86+80.25=160.11 kJ s$^{-1}$ Thermal energy consumption: 160.11*992.1 kJ m$^{-3}$=44.12 kWh m$^{-3}$ Pump Electricity:

$$\dot{P}_P = \frac{\dot{V} \Delta P}{\eta_P \eta_e}$$

The flow velocity in the heat exchanger may be kept unchanged. The pump electricity consumption is proportional to the volume flow rate and the pressure drop across the heat exchanger. Total pump electricity consumption is calculated to be about 0.06 kWh m$^{-3}$.

For pump 3 of FIG. 7, the volume flow rate is as follows $$\dot{V}_3 = \frac{m_w}{\rho_w} + \frac{m_w}{Y\rho_{so}}$$

For pump 2 of FIG. 7, the volume flow rate is $$\dot{V}_2 = \frac{m_w}{Y\rho_{so}}$$

For pump 1 of FIG. 7, the volume flow rate is $$\dot{V}_1 = \frac{m_w}{RR\rho_B}$$

Thus, the pump electricity consumption can be calculated as follows $$\dot{P}_P = \frac{\dot{V}_1 \Delta P_1}{\eta_P \eta_e} + \frac{\dot{V}_2 \Delta P_2}{\eta_P \eta_e} + \frac{\dot{V}_3 \Delta P_3}{\eta_P \eta_e} = \left(\frac{m_w}{\rho_w} + \frac{m_w}{Y\rho_{so}}\right)\frac{\Delta P_1}{\eta_P \eta_e} + \left(\frac{m_w}{Y\rho_{so}}\right)\frac{\Delta P_2}{\eta_P \eta_e} + \left(\frac{m_w}{RR\rho_B}\right)\frac{\Delta P_3}{\eta_P \eta_e}$$

The pressure drop across the heat exchanger can be calculated by the following equation:

$$\Delta P = f\rho \frac{L}{D_h} \frac{v^2}{2}$$

We note that the pump power may be further reduced with better heat exchanger design, where the pressure loss is the most significant.

The mixing electricity consumption:

$$\dot{P}_m = \frac{PN\rho\omega^3 D_{im}^5}{\eta_e}$$

The volume flow rate of the mixture is about 1/6.5 (about 15%) of that in the previously referenced inventors' literature, after increasing the water yield by 10 times. The diameter of the pump impeller may be about 1/1.87 (about 50-55%) of that reported previously. Thus, the mixing electricity consumption may be about 1/23 (about 4%) of that reported previously. The electricity consumption may thus be very low and may be neglected.

The Separation Electricity Consumption:

Electricity consumption per volume emulsion $EEC_{em}$ is about 0.053 kWh m$^{-3}$ $$EEC_s = EEC_{em}/Y = 0.053 \cdot 3.11 = 0.1683 \text{ kWh m}^{-3}.$$

Figure 10:
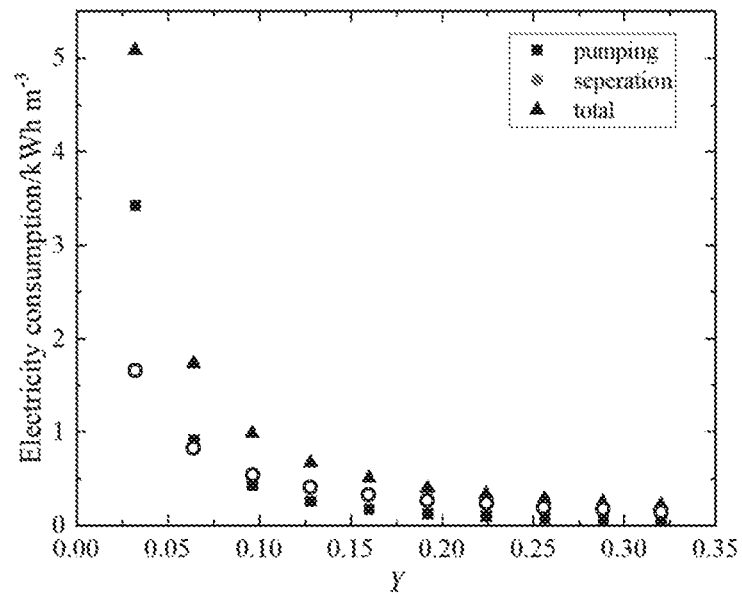
FIG. 10 shows electrical energy consumption for the process of FIG. 7, with heat recovery, as a function of water yield, where the highest process temperature is 80° C. and at a heat exchanger efficiency of 80%.

The total electricity consumption is about 0.5983 kWh m$^{-3}$ for one unit of fresh water produced. FIG. 10 shows the electricity energy consumption versus water yield. Results show that electricity consumption decreases with water yield.

When the heat exchanger efficiency is set at 80%, the maximum thermal to electricity efficiency obtained may be about 4.81%. If pumping and separation electricity consumption were further reduced, the efficiency may reach 5.36%.

Further improvements may be possible by identifying higher performance solvents for use as ion-stripping liquids, by optimizing process design to improve heat recovery and minimize pumping losses, and to design high performance PRO membranes and systems to enhance electricity production efficiency from a given salinity gradient.

Features from any of the disclosed embodiments or claims may be used in combination with one another, without limitation. It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. A system for generating electrical energy from low grade heat, the system comprising:
   a medium salinity liquid including water, a salt, and an ion-stripping liquid;
   a first separation tank for separating the medium salinity liquid into a high salinity liquid stream including an elevated concentration of the salt, and a supernatant stream including the water and the ion-stripping liquid;
   a second separation tank for separating the supernatant stream into a low salinity liquid stream including water, and an ion-stripping liquid stream including the ion-stripping liquid;
   wherein the first separation tank maintains the medium salinity liquid at a higher temperature than a temperature at which the second separation tank operates, the medium salinity liquid being heated by low grade heat;
   an electrical generation module including a first chamber for receiving the low salinity liquid stream, and a second chamber for receiving the high salinity liquid stream, the first and second chambers being separated by a semipermeable membrane, wherein the electrical generation module is configured to generate electricity from a salinity gradient defined by the high and low salinity liquid streams;
   outlets from the first and second chambers of the electrical generation module for drawing off exit streams of the low salinity liquid stream and the high salinity liquid stream, mixing of the exit streams reforming the medium salinity liquid once the exit streams are combined with the ion-stripping liquid stream from the second separation tank.

2. A system as recited in claim 1, wherein the ion-stripping liquid comprises an organic compound.

3. A system as recited in claim 2, wherein the ion-stripping liquid comprises an ionic liquid.

4. A system as recited in claim 3, wherein the ionic liquid comprises a heterocyclic anion.

5. A system as recited in claim 4, wherein the ionic liquid comprises [EMIM][Tf2N].

6. A system as recited in claim 2, wherein the ion-stripping liquid comprises a carboxylic acid having from 4 to 20 carbon atoms.

7. A system as recited in claim 1, wherein the salt comprises at least one of a halide, sulfate, phosphate, acetate, nitrate, perchlorate, carbonate, or hydroxide.

8. A system as recited in claim 1, wherein the salt comprises at least one of an alkali metal, or alkaline earth metal.

9. A system as recited in claim 1, wherein the first separation tank is heated and/or insulated to maintain the high salinity liquid stream and the supernatant stream at the higher temperature, which is elevated above ambient temperature.

10. A system as recited in claim 1, wherein the low grade heat and the first separation tank are at a temperature of no more than 90° C.

11. A system as recited in claim 1, wherein the low grade heat comprises solar heating or low grade waste heat from an industrial process.

12. A system as recited in claim 1, wherein the second separation tank is maintained at a lower temperature than the first separation tank so that the low salinity liquid stream and the ion-stripping liquid stream are cooler than the high salinity liquid stream and the supernatant stream.

13. A system as recited in claim 1, wherein the system is a closed loop, in which the medium salinity liquid exiting the electrical generating module is recycled back to the first separation tank, the low salinity liquid stream and high salinity liquid stream being free of biological materials that would induce fouling of the membrane.

14. A system as recited in claim 1, wherein the electrical generating module comprises a pressure retarded osmosis module.

15. A closed loop method for generating electricity using low grade heat, the method comprising:
   providing a medium salinity liquid including water, a salt, and an ion-stripping liquid;
   heating the medium salinity liquid with low grade heat having a temperature of no more than 90° C.;
   introducing the heated medium salinity liquid into a first separation tank, where the heated medium salinity liquid separates into a high salinity stream including an elevated concentration of the salt, and a supernatant stream including the water and the ion-stripping liquid;
   extracting the high-salinity stream from the first separation tank;
   extracting the supernatant stream from the first separation tank;
   passing the supernatant stream through a heat exchanger to cool the supernatant stream and heat another stream of the method;
   introducing the cooled supernatant stream into a second separation tank where the cooled supernatant stream separates into a low salinity liquid stream including water, and a ion-stripping liquid stream including the ion-stripping liquid;

introducing the low salinity liquid stream from the second separation tank and the high salinity stream extracted from the separation tank into first and second chambers of an electrical generation module where the first and second chambers are separated by a membrane, wherein the electrical generation module is configured to generate electricity from a salinity gradient defined by the high and low salinity liquid streams;

drawing exit streams from the first chamber and the second chamber, whereupon mixing such exit streams, the medium salinity liquid is reformed once combined with the ion-stripping liquid stream from the second separation tank, for reintroduction back to the first separation tank.

16. A method as recited in claim 15, wherein a difference in salt content between the high salinity liquid stream and the low salinity liquid stream is at least 5 percentage points.

17. A method as recited in claim 15, wherein the electrical generating module comprises a pressure retarded osmosis module.

18. A method as recited in claim 15, wherein separation of the high salinity liquid stream from the supernatant stream occurs due to gravity, in the first separation tank.

19. A method as recited in claim 15, wherein separation of the low salinity liquid stream from the ion-stripping liquid stream occurs due to gravity, in the second separation tank.

20. A system for generating electrical energy from low grade heat, the system comprising:

a medium salinity liquid including water, a salt, and an ion-stripping liquid;

a first gravitational separation tank for separating the medium salinity liquid into a high salinity liquid stream including an elevated concentration of the salt, and a supernatant stream including the water and the ion-stripping liquid;

a second gravitational separation tank for separating the supernatant stream into a low salinity liquid stream including water, and an ion-stripping liquid stream including the ion-stripping liquid;

wherein the first gravitational separation tank maintains the medium salinity liquid at a higher temperature than a temperature at which the second separation tank operates, the medium salinity liquid being heated by low grade heat, wherein the first separation tank operates at 40° C. to 80° C., and the second separation tank operates at 20° C. to 40° C., the first separation tank operating at a higher temperature than the second separation tank;

a pressure retarded osmosis electrical generation module including a first chamber for receiving the low salinity liquid stream, and a second chamber for receiving the high salinity liquid stream, the first and second chambers being separated by a semipermeable membrane, wherein water from the low salinity liquid stream in the first chamber migrates to the high salinity liquid stream in the second chamber as a result of a salinity gradient defined by the high and low salinity liquid stream, increasing the pressure in the second chamber;

an outlet from the second chamber drawing off pressurized high salinity liquid from the second chamber to drive an electrical generation turbine an outlet from the first chamber drawing off low salinity liquid from the first chamber, for combination with the drawn off high salinity liquid exiting the electrical generation turbine, to reform the medium salinity liquid once combined with the ion-stripping liquid stream from the second separation tank.

* * * * *